(12) United States Patent
Hecht

(10) Patent No.: US 7,235,777 B2
(45) Date of Patent: Jun. 26, 2007

(54) LIGHT SCANNING MICROSCOPE AND USE

(75) Inventor: Frank Hecht, Weimar (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 11/364,368

(22) Filed: Mar. 1, 2006

(65) Prior Publication Data

US 2006/0208178 A1 Sep. 21, 2006

Related U.S. Application Data

(63) Continuation of application No. 10/967,323, filed on Oct. 19, 2004, now abandoned.

(30) Foreign Application Priority Data

Jul. 16, 2004 (DE) ............... 10 2004 034 988

(51) Int. Cl.
*H01J 3/14* (2006.01)
(52) U.S. Cl. .................................................. 250/234
(58) Field of Classification Search ................ 250/234, 250/235, 201.3; 359/385, 391, 393
See application file for complete search history.

(56) References Cited

U.S. PATENT DOCUMENTS

| 4,700,298 | A | 10/1987 | Palcic et al. |
|---|---|---|---|
| 5,386,112 | A | 1/1995 | Dixon |
| 6,028,306 | A | 2/2000 | Hayashi |
| 6,167,173 | A | 12/2000 | Schoeppe et al. |
| 6,186,315 | B1 | 2/2001 | Schmick |
| 6,219,437 | B1 | 4/2001 | Baldur |
| 6,407,808 | B2 * | 6/2002 | Yoda et al. ............... 356/237.2 |
| 6,548,796 | B1 | 4/2003 | Silvermintz et al. |
| 6,711,283 | B1 | 3/2004 | Soenksen |
| 6,852,964 | B2 | 2/2005 | Engelhardt |
| 6,888,148 | B2 | 5/2005 | Wolleschensky |
| 2002/0080347 | A1 | 6/2002 | Yoda et al. |
| 2002/0163717 | A1 | 11/2002 | Jawoong |
| 2003/0142292 | A1 | 7/2003 | Wolleschensky |

FOREIGN PATENT DOCUMENTS

DE 2360197 6/1975

(Continued)

OTHER PUBLICATIONS

Edited by J. B. Pawley, Handbook of Biological Confocal Microscopy, Second Ed., 1995, Chapter 29, pp. 461-462 "Resonant Galvanometers" (Fig. 1 appearing on p. 460).

(Continued)

*Primary Examiner*—Kevin Pyo
(74) *Attorney, Agent, or Firm*—Jacobson Holman PLLC

(57) ABSTRACT

Light scanning microscope with an at least single-dimensional light distribution for grid-shaped illumination of a sample in a locally limited grid field and detector means for recording sample light as well as a sample table that moves in at least one direction, whereby in a first process step an illumination of the sample, detection of sample light and data recording of the detection is carried out during a movement of the sample table in at least a first direction over the dimensions of the grid field and the recording of the respective table position is assigned to the data recording.

10 Claims, 5 Drawing Sheets

FOREIGN PATENT DOCUMENTS

| | | |
|---|---|---|
| DE | 19702753 | 1/1997 |
| DE | 10058100 | 6/2002 |
| DE | 10257237 | 6/2003 |
| EP | 0557558 A1 | 9/1993 |
| GB | 2383487 A | 6/2003 |
| WO | WO 88 07695 | 10/1998 |

OTHER PUBLICATIONS

Mats G. L. Gustafsson et al., "Doubling the lateral resolution of wide-field fluorescence microscopy using structured illumination", Proceedings of SPIE, vol. 3919, May 2000, pp. 141-150. (Abstract Only).

* cited by examiner

LIGHT SCANNING MICROSCOPE AND USE

This application is a continuation of U.S. patent application Ser. No. 10/967,323 filed Oct. 19, 2004 now abandoned.

The invention describes a method and a device which makes possible faster scanning of large samples. The method is especially suitable for cases in which the recording region is larger than the maximum image field of the microscope.

STATE OF THE ART

In the recording of large samples, currently several images or batches are recorded, whereby the sample is moved with a motorized sample table between recording of the images or batches. The images or batches recorded are then copied into a complete image according to the table position. Developments with respect to increasing the recording speed of images and batches with confocal microscopes had led to the situation that the table positioning makes a significant contribution to the total recording time.

New Suggested Solution

Figure 1:
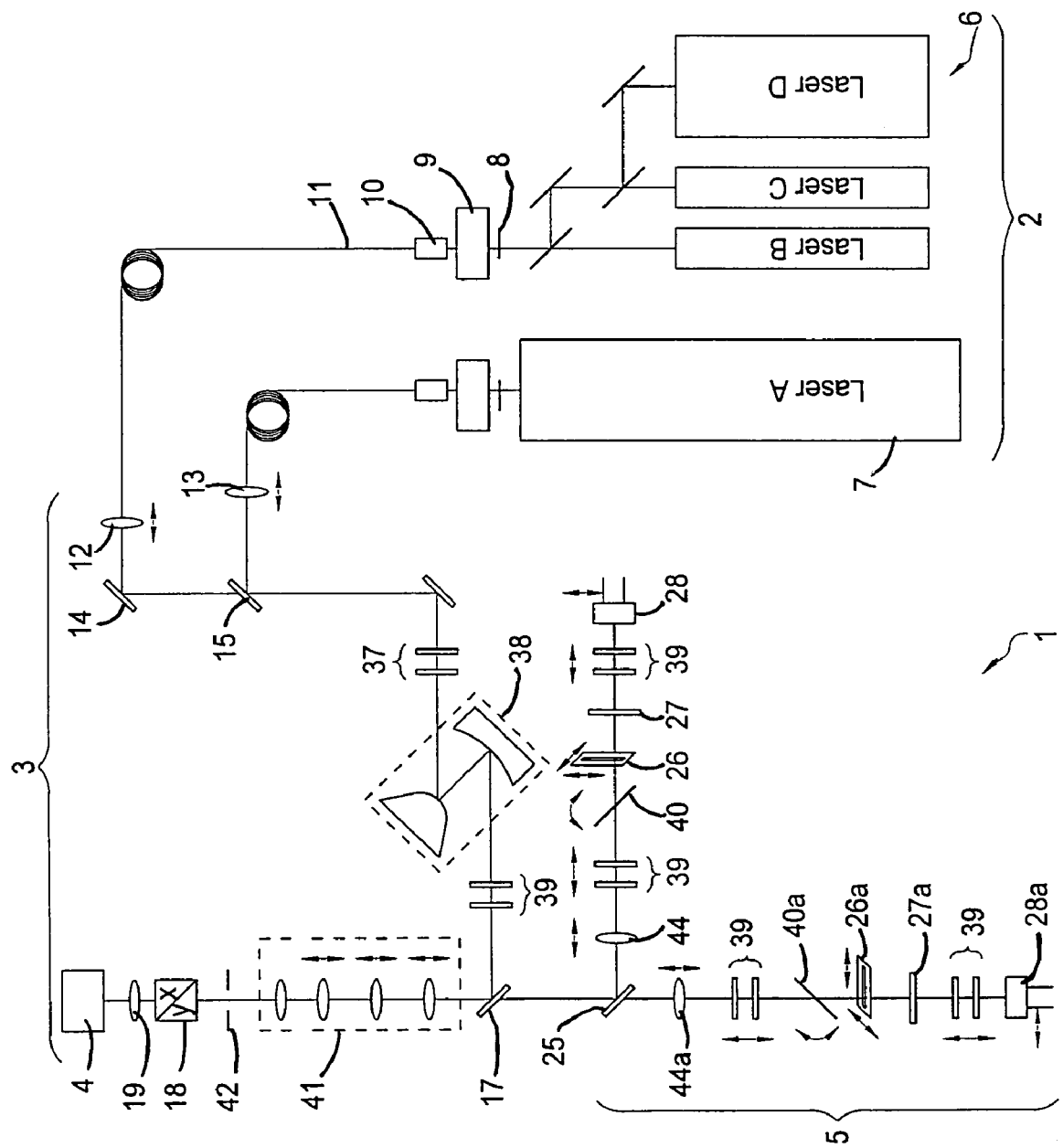
Figure 2:
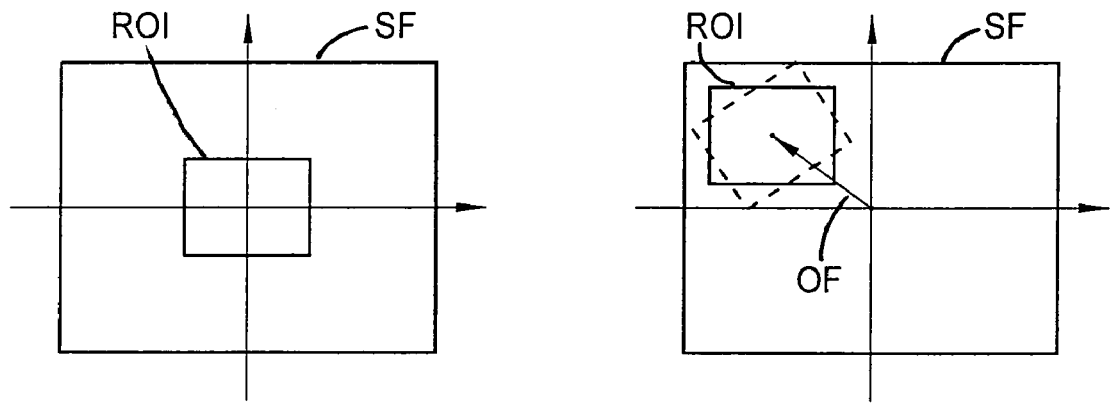
Figure 4:
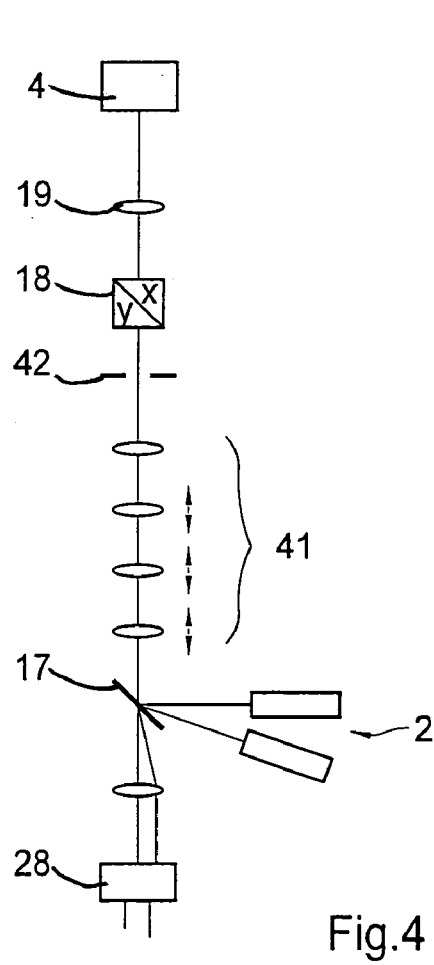
Figure 3:
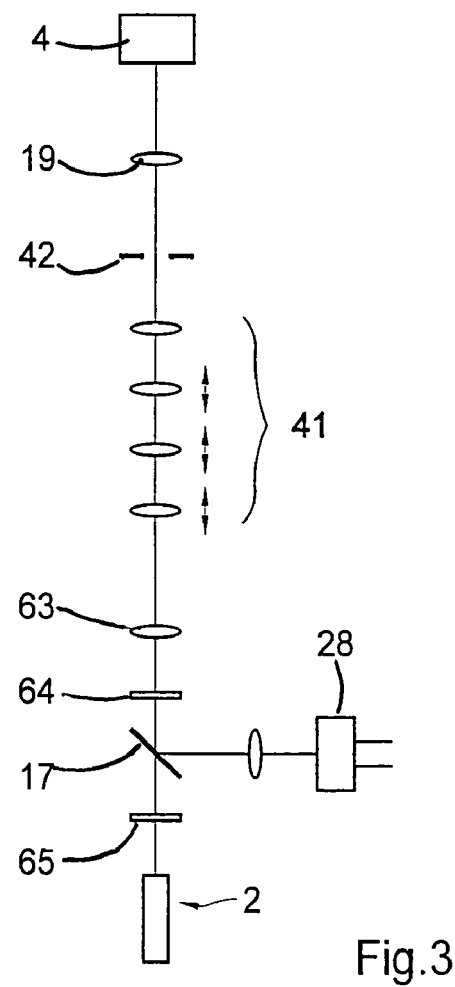

In the following, the invention will be described by way of example with reference to the drawings. They show:

FIG. 1 Shows a schematic representation of a laser scanning microscope with radiation source module, scanning module and detector module, FIG. 2 Shows a schematic representation of a scanning field for representing possible zoom effects, FIG. 3 Shows a schematic representation of a laser scanning microscope with a Nipkow disk, FIG. 4 Shows a schematic representation of a laser scanning microscope with parallel multi-point illumination and scanning.

FIG. 1 shows, schematically, a laser scanning microscope 1, which is essentially constructed of five components: a radiation source module 2 that generates the excitation radiation for the laser scanning microscopy, a scanning module 3 that conditions the excitation radiation and suitably deflects it over the sample for scanning, a microscope module 4 that is shown only schematically for simplification which steers the scanning radiation prepared by the scanning module in a microscopic beam to the sample, as well as a detector module 5 that receives and detects optical radiation from the sample. In this case, the detector module 5 can be designed with several spectral channels as shown in FIG. 1.

Reference is made to DE 19702753A1 for the general description of a point-by-point laser scanning microscope, which thus becomes a component of the present description.

The radiation source module 2 generates illumination radiation that is suitable for laser scanning microscopy, i.e. radiation that can trigger fluorescence. Depending on the application, the radiation source module has several radiation sources for this. In an embodiment shown, two lasers 6 and 7 are provided in the radiation source module 2, each of which has a light valve 8 and an attenuator 9 mounted after it and that couple their radiation over a coupling point 10 into a fiber optic cable 11. The light valve 8 acts as a beam deflector that can be used for beam shutoff without the operation of the laser in the laser unit 6 and/or 7 itself having to be turned off. The light valve 8 is designed as e.g. an AOTF that deflects the laser beam in the direction of a light trap that is not shown before coupling in the fiber optic cable 11 to turn the beam off.

In the example representation in FIG. 1, the laser unit 6 has three lasers, B, C, D, while on the other hand laser unit 7 has only one laser A. The representation is also an example of a combination of single and multi-wave length lasers which are coupled individually or also in common to one or more fibers. Also, the coupling can also occur by way of several fibers simultaneously whose beam is later mixed by a color combiner after passing through an adapting optics. Thus, it is possible to use all different wave lengths or ranges for the excitation radiation.

The radiation coupled in the fiber optic cable 11 is combined by means of movable collimation optics 12 and 13 over beam concentration mirrors 14, 15 and changed with respect to the beam profile in a beam-shaping unit.

The collimators 12, 13 provide that the radiation supplied by the radiation source module 2 to the scanning module 3 is collimated into an infinite beam path. In each case, this is advantageously carried out with a single lens that has a focusing function by sliding along the optical axis under the control of a central control unit (that is not shown) in that the distance between collimator 12, 13 and the respective end of the fiber optic cable can be changed.

The beam-forming unit, which will be explained in more detail below, generates, from the rotation-symmetrical, Gaussian profiled laser beam as is present after the beam concentration mirrors 14, 15, a line-shaped beam that is no longer rotation-symmetrical but is suitable in its cross section for generating a square illuminated field.

This illumination beam that is also referred to as line-shaped is used as the excitation radiation and will be guided over a main color splitter 17 and zoom optics, which are yet to be described, to a scanner 18. More details will be given later about the main color splitter, it only needs to be mentioned here that it has the function of separating the sample beam returning from the microscope module 4 from the excitation radiation.

The scanner 18 deflects the line-shaped beam in one or two axes, after which it is bundled by a scanning objective 19, as well as a tube lens and an objective of the microscope module 4 into a focus that lies in a preparation and/or on a sample. The optical imaging is carried out in this process so that the sample will be illuminated with excitation radiation in a focal line.

This type of fluorescence radiation that is excited in a line-shaped focus goes over lens and tube lens of the microscope module 4 and the scanning objective 19 back to the scanner 18 so that in the return direction after scanner 18 a static beam is again present. Therefore, it is said that the scanner 18 de-scans the fluorescence radiation.

The main color splitter 17 allows the fluorescence radiation lying in wave length ranges other than that of the excitation radiation to pass through so that it is diverted over a deviation mirror in detector module 5 and can then be analyzed. In the embodiment in FIG. 1, the detector module 5 has several spectral channels, i.e. a fluorescence radiation coming from the deviation mirror will be divided into two spectral channels in an auxiliary color splitter 25.

Each spectral channel has a slotted diaphragm 26 that creates a confocal or semi-confocal image with respect to sample and whose size is specified by the depth of focus with which the fluorescence radiation can be detected. The geometry of the slotted diaphragm 26 thus determines the cross section plane within the (thick) preparation from which the fluorescence radiation is detected.

The slotted diaphragm 26 has a block filter 27 mounted after it that blocks undesirable excitation radiation that has gotten to the detector module 5. The line-shaped, fanned out radiation coming from a specific deep section that is separated in this way will then be analyzed by a suitable detector 28. The second spectral detection channel, which also comprises a slotted diaphragm 26a, a blocking filter 27a and a detector 28a, is also designed analogously to the color channel described.

The use of a confocal slot aperture in the detector module 5 is only used as an example. Naturally, a single point scanner can also be produced. The slotted diaphragms 26, 26a are then replaced by aperture diaphragms and the beam-forming unit can be eliminated. Also, for a construction such as this, all optics are designed with rotation symmetry. Then naturally instead of a single point scanning and detection, in principle any multi-point arrangements like scatter plots or Nipkow disk concepts can be used, which will be explained further using FIGS. 3 and 4. However, what is important is that the detector 28 has local resolution since a parallel recording of several sample points is carried out when passing through the scanner.

FIG. 1 shows that the movable, i.e. sliding, collimators 12 and 13 combine Gaussian beam bundles that are present over mirror steps in the form of beam-combining mirrors 14, 16 and in the construction type shown with confocal slotted diaphragm, are then converted into a beam bundle with square beam cross section. In the embodiment in FIG. 1, in the beam-forming unit a cylinder telescope 37 is used, which has an aspherical unit 38 mounted after it, followed by cylinder optics 39.

After shaping, a beam is present that in its profile plane essentially illuminates a square field, whereby the intensity distribution along the field's longitudinal axis is not Gaussian but box-shaped.

The illumination arrangement with the aspherical unit 38 can be used for uniform filling of a pupil between a tube lens and a lens. In this way, the optical resolution of the lens can be fully utilized. This variation is thus also effective in a microscope system that scans single points or multiple points, e.g. in a line-scanning system (in the latter additionally to the axis, in which focusing on or in the sample is carried out).

The e.g. line-shaped conditioned excitation radiation is guided to the main color splitter 17. This is designed, in a preferred embodiment, as spectral-neutral separating mirrors according to DE 10257237 A1, whose disclosure is included here in its full scope. The term "color splitter" thus also includes splitter systems that do not work spectrally. Instead of the spectral independent color splitter that has been described, a homogeneous neutral splitter (e.g. 50/50, 70/30, 80/20, etc.) or a dichroic splitter can also be used. In this way, a selection is possible depending on the application, if the main color splitter is preferably provided with a mechanical device that makes change simple, e.g. by a corresponding splitter wheel that contains individual replaceable splitters.

A dichroic main color splitter is especially advantageous when coherent, i.e. directional beams will be detected, e.g. reflection, Stokes and/or anti-Stokes Raman spectroscopy, coherent Raman processes of a higher order, generally parametric non-linear optical processes like second harmonic generation, third harmonic generation, sum frequency generation, double photon and multi-photon absorption and/or fluorescence. Several of these methods of non-linear optical spectroscopy require the use of two or more laser beams that are superimposed in a collinear way. In this case, the beam concentration of beams from several lasers has proven to be especially advantageous. Basically, in fluorescence microscopy, widely available dichroic beam splitters can be used.

Also, for Raman microscopy, it is advantageous to use holographic notch splitters or filters before the detectors for suppression of the Rayleigh scatter portion.

In the embodiment in FIG. 1, the excitation radiation and/or illumination radiation is supplied to the scanner 18 by way of zoom optics 41 that can be controlled with a motor. In this way, the zoom factor can be adjusted and the scanned visual field can be varied continuously within a specific adjusting range. Especially advantageous are zoom optics in which the pupil position is maintained in the continuous tuning process during adaptation of the focus location and the imaging scale. The three motor degrees of freedom of zoom optics 41 shown in FIG. 1 and symbolized with arrows correspond precisely to the number of degrees of freedom that are provided for adjustment of the three parameters image scale, focus position and pupil position. Especially preferred are zoom optics 41 that have a fixed shutter 42 mounted on its output pupil diaphragm. In a practical simple implementation, the shutter 42 can also be produced by the limitation of the mirror surface of scanner 18. The output side shutter 42 with zoom optics 41 have the result that a specified pupil diameter can always be displayed on the scanning objective 19 independently of the adjustment of the zoom enlargement. Thus, the objective pupil remains completely illuminated even during any adjustment of the zoom optics 41. The use of an independent shutter 42 advantageously prevents the occurrence of undesirable scatter radiation in the area of the scanner 18.

The cylinder telescope 37, which can also be operated with a motor and is mounted before the aspherical unit 38, works together with zoom optics 41. This has been selected in the embodiment in FIG. 2 for reasons of a compact structure but need not necessarily be this way.

If a zoom factor less than 1.0 is desired, the cylinder telescope 37 is automatically swiveled into the optical beam. It prevents the aperture diaphragm 42 from being incompletely illuminated when the zoom objective 41 is reduced. The swiveling cylinder telescope 37 thus guarantees that even with zoom factors less than 1, i.e. independent of the adjustment of zoom optics 41, an illumination line of a constant length will always be present at the location of the objective pupil. In comparison to the simple visual field zoom, laser power losses are thus prevented in the illumination beam.

Since when the cylinder telescope 37 is swiveled in, a jump in display brightness is unavoidable in the illumination line, a provision is made in the control unit (not shown) that the traversing speed of scanner 18 or an amplification factor of the detectors in detector module 5 is adapted accordingly with active cylinder telescope 37 in order to keep the display brightness constant.

In addition to the zoom optics 41 driven by a motor as well as the cylinder telescope 37 that can be activated with a motor, remote controlled adjusting elements are also provided in the detector module 5 of the laser scanning microscope in FIG. 1. For compensation of color longitudinal errors, for example, round optics 44 and cylinder optics 39 are mounted before the slotted diaphragm and cylinder optics 39 are provided directly before the detector 28, and each of these can be moved in axial direction with a motor.

In addition, a correction unit 40, which will be described briefly below, is provided for compensation.

The slotted diaphragm 26, together with round optics 44 mounted in front of it and the first cylinder optics 39 also mounted in front of it and the second cylinder optics mounted after it, forms a pinhole objective in detector arrangement 5, whereby the pinhole is implemented here by the slotted diaphragm 26. In order to prevent the undesirable detection of excitation radiation reflected in the system, the second cylinder lens 39 also has a blocking filter 27 before it that has suitable spectral properties to allow only desirable fluorescence radiation to get to detector 28, 28a.

A change in the color splitter 25 or the blocking filter 27 unavoidably causes a certain tipping or wedge error during swiveling. The color splitter can cause an error between sample area and slotted diaphragm 26, the blocking filter 27 can cause an error between the slotted diaphragm 26 and detector 28. In order to prevent the necessity of a recalibration of the position of the slotted diaphragm 26 and/or the detector 28, a plane parallel plate 40 is mounted between round optics 44 and the slotted diaphragm 26, i.e. in the image beam between sample and detector 28, which can be brought into different tipped positions under the control of a controller. For this purpose, the plane parallel plate 40 is mounted in an adjustable bracket.

FIG. 2 shows how an area (region of interest) ROI can be selected with the help of the zoom optics 41 within the maximum scan field SF that is available. If the control of the scanner 18 is left such that the amplitude does not change, as is absolutely necessary e.g. with resonance scanners, an enlargement greater than 1.0 set on the zoom optics causes a constriction of the selected ROI, centered around the optical axis of the scan field SF.

Resonance scanners are described, for example, in Pawley, Handbook of Biological Confocal Microscopy, Plenum Press 1994, page 461ff.

If the scanner is controlled in such a way that it scans a field asymmetrically to the optical axis, i.e. to the rest position of the scanner mirror, an offset displacement OF of the selected ROI will be obtained in connection with a zoom effect. Because of the effect of the scanner 18 to descan, as already mentioned, and by the repeat passage through the zoom optics 41, the selection of the region of interest ROI in the detection beam path will again be lifted in the direction of the detector. In this way, a selection lying within the scan image SF can be made for the region of interest ROI. In addition, images can be obtained for different selections of the region of interest ROI, and these can be combined to a high resolution image.

If the goal is not only to move the selected range of interest ROI by an offset OF with respect to the optical axis, but additionally to rotate it, an embodiment is effective that provides an Abbe-König prism in a pupil in the beam path between main color splitter 17 and sample 23, which results in an image field rotation, as is known. Also, this will be lifted in the direction of the detector. Now images with different offset displacements OF and different rotation angles can be measured and then put together to make a high resolution image, for example according to an algorithm as is described in the publication Gustafsson, M., "Doubling the lateral resolution of wide-field fluorescence microscopy using structured illumination," in "Three-dimensional and multidimensional microscopy: Image acquisition processing VII," Proceedings of SPIE, Vol. 3919 (2000), pages 141–150.

FIG. 3 shows another possible construction type for a laser scanning microscope 1, in which a Nipkow disk attachment is used. The light source module 2, which is shown greatly simplified in FIG. 3, illuminates, over a mini-lens array 65 through the main color splitter 17, a Nipkow disk 64 as is described in U.S. Pat. No. 6,028,306, WO 88 07695 or DE 2360197 A1. The pinholes of the Nipkow disk illuminated by the mini-lens array 65 are imaged on the sample found in the microscope module 4. Zoom optics 41 are provided here as well to be able to vary the image size on the sample side.

As a change to the construction in FIG. 1, in the Nipkow scanner the illumination is carried out in the passage through the main color splitter 17 and the radiation to be detected will be mirrored. In addition, as a change from FIG. 2, the detector 28 is now designed so that it has local resolution so that the multi-point illumination achieved with the Nipkow disk 64 can also be scanned in parallel. In addition, suitable fixed optics 63 with positive refractive power are mounted between the Nipkow disk 64 and the zoom optics 41, which converts divergent radiation coming through the pinholes of the Nipkow disk 64 into a suitable bundle diameter. The main color splitter 17 for the Nipkow construction in FIG. 3 is a classic dichroic beam splitter, i.e. not the beam splitter mentioned above with slot-shaped or point-shaped reflecting area.

The zoom optics 41 correspond to the previously explained construction whereby naturally the scanner 18 becomes superfluous because of the Nipkow disk 64. However, it can still be provided if the selection of a region of interest ROI will be carried out as explained using FIG. 2. The same is true of the Abbe-König prism.

FIG. 4 shows an alternative solution schematically with multi-point scanning, in which several light sources radiate diagonally into the scanner aperture diaphragm. Here as well, because of the use of the zoom optics 41, a zoom function as shown in FIG. 2 can be implemented for imaging between main color splitter 17 and scanner 18. By simultaneous radiation of light bundles at different angles in a plane conjugate to a pupil, light points will be generated in a plane conjugate to the lens plane that are guided by scanner 18 simultaneously over a partial area of the entire lens field. The image information is developed by evaluation of all the partial images on a local resolution matrix detector 28.

Another embodiment that can be considered is a multi-point scanning as described in U.S. Pat. No. 6,028,306, the disclosure of which is included here in its full scope in this regard. Here as well, a local resolution detector 28 is provided. The sample is then illuminated by a multi-point light source that is implemented by a beam expander with downstream micro-lens array, which illuminates a multi-aperture plate in such a way that a multi-point light source is implemented.

Figure 5:
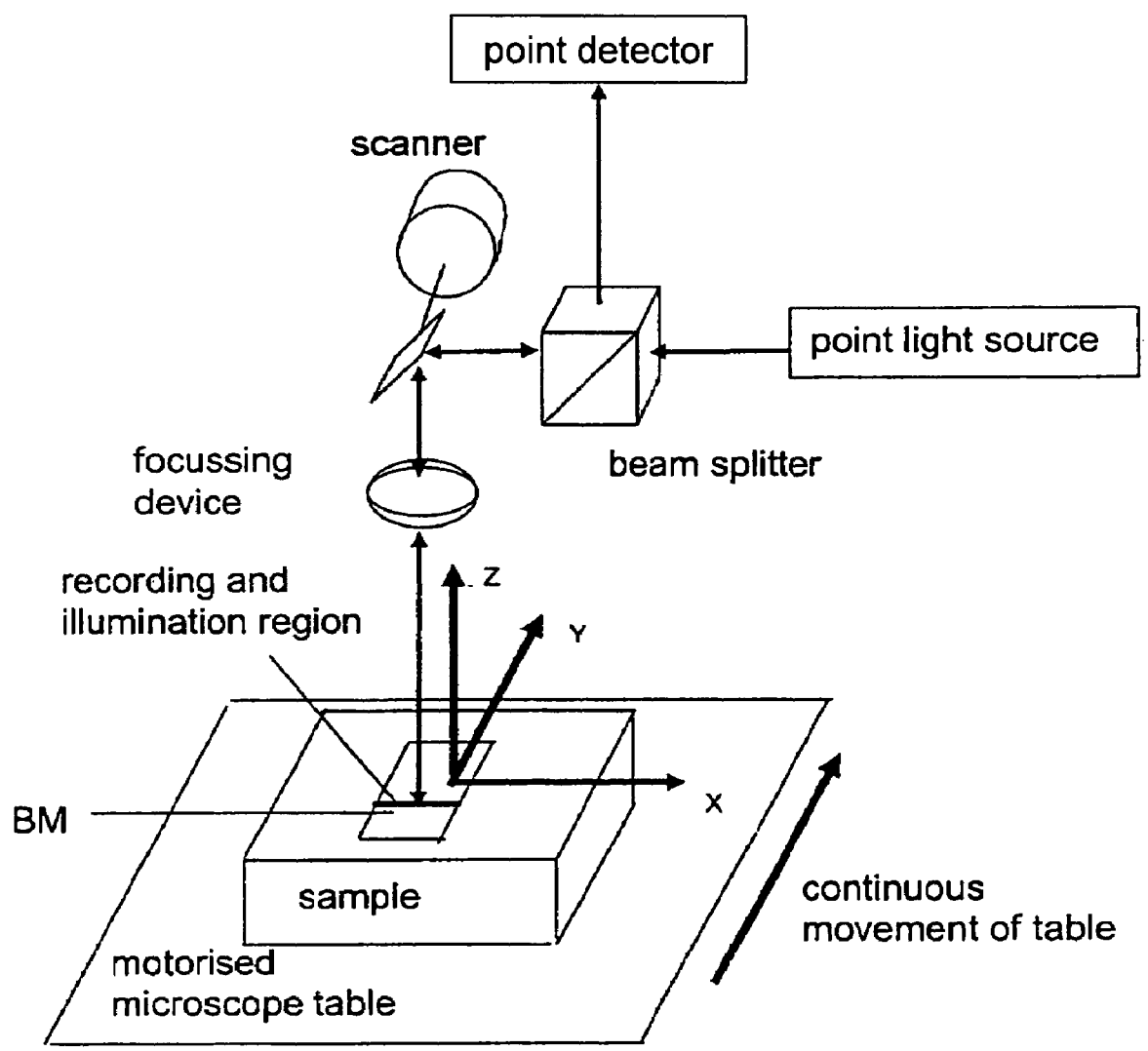

FIG. 5 shows a scan of a large sample with a (X/Y) point scanner, a point light source and a point detector, by way of a focusing device.

The image recording/illumination region BM of the point scanning that occurs line by line is determined in X direction by the scanner parameters and the optics used. In Y direction, it goes beyond the normal scanning field of a point scanner that would be limited by a corresponding Y scanner and in this case is replaced by the continuous Y drive of the table.

Figure 6:
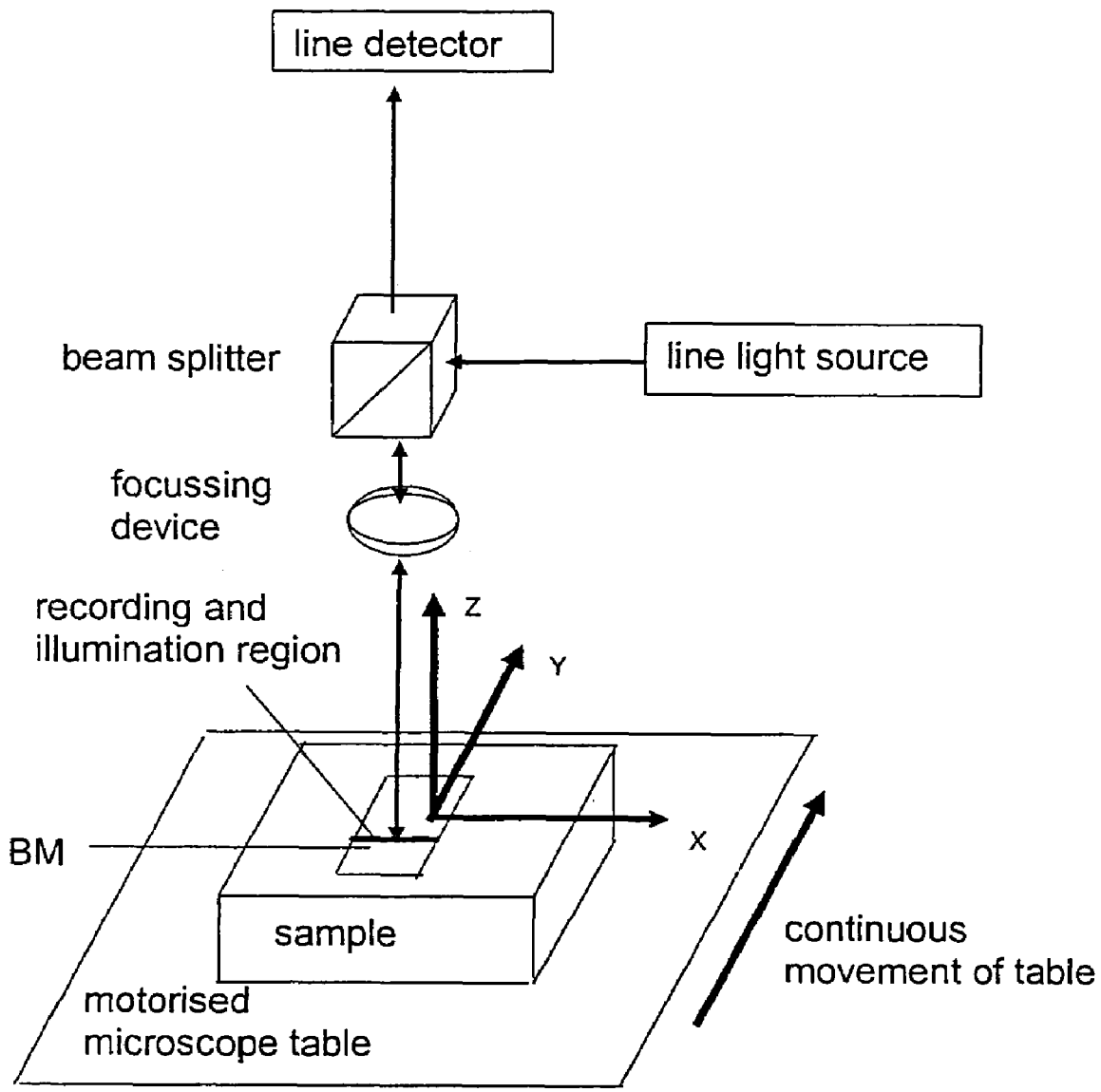

FIG. 6 shows a line-shaped light source according to FIG. 1 imaged on the sample and the table in turn moved in Y direction.

A three-dimensional coordinate system is specified in such a way that the z axis runs in the direction of the optical axis of the microscope. The x and y axes run orthogonally to the z axis. Their precise direction is not relevant for the description of the process.

In the process according to the invention, recording is carried out along a line in the x direction for recording the entire region. The microscope table is driven with constant speed in the direction of the y axis. The data recorded in the individual lines will be copied into adjacent lines of an image memory in the sequence in which they were recorded.

By repeating this procedure at different y positions in the sample, an image can be created that is larger in both the x direction and the y direction than the maximum image field of the microscope.

For a recording of large batches, the recording line will also be slid periodically in the x direction.

Figure 7:
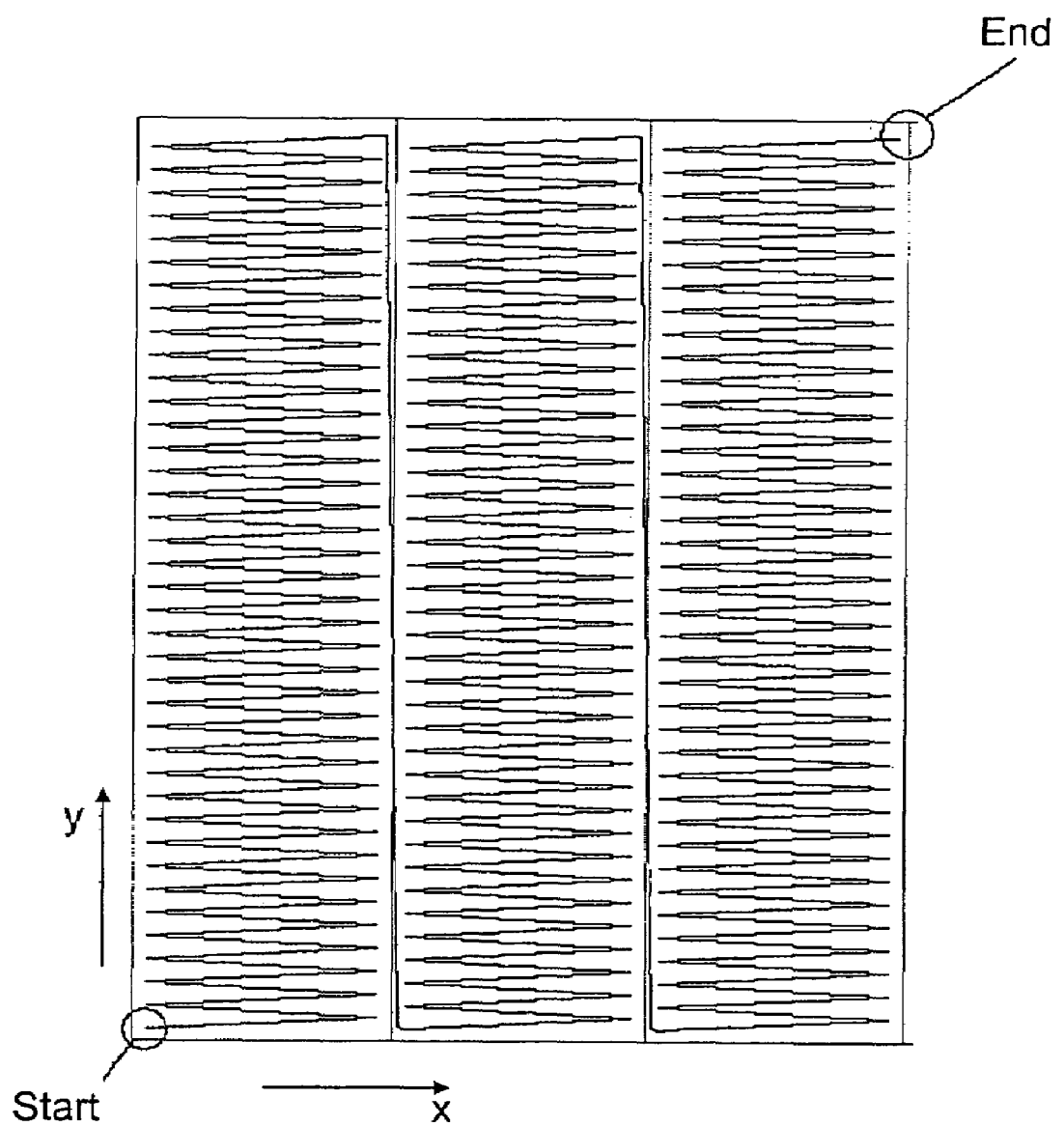

The curve that a laser spot follows in the sample with a point scanner is shown in FIG. 7. This can be carried over to a line scanner analogously.

In the following, the term image strip is intended to mean the image section for which image data is recorded at the same X position of the table. The X position for the strips recorded on the left would, for example, lie at the position of the starting point in each case. The illustration shows three image strips at different X (start) positions.

Recording can take place either directly in a result image memory or in intermediate memories for the individual image strips. In the latter case, the image strips will then be saved in the results image memory at the place that corresponds to the recording position.

When there are inaccuracies in the table movement in x and y direction, there can be visible corruptions at the meeting points of the image strips. To prevent this, recording of the image strips can be carried out with an overlap. Then the actual relative table position of the image strips is determined from the image information in the overlapping area using image characteristics by an image comparison or correlation, and the image strip can be copied in the results memory with an appropriate offset. In this case, intermediate memories are necessary for image strips. At a minimum, one intermediate memory for one image strip is necessary. The determination of the actual relative table positions can be carried out using cross-correlations.

A possible sequence of recording with correction with respect to the actual table position is:
1. Recording of the first image strip with storage in the intermediate memory.
2. Copying of the image strip from the intermediate memory to the results image memory
3. Movement of the table in x direction
4. Recording of the next image strip
5. Determination of the actual relative table position from the image data of the overlapping area from intermediate memory and results image memory
6. Copying of the image strip from the intermediate memory into the results image memory at the position that corresponds to the specific table position
7. When all image strips have been recorded, the recording is ended, otherwise the recording will be continued at step 3.

The invention claimed is:

1. Laser scanning microscope comprising:

a sample table movable in at least a first direction over the dimensions of a locally-limited grid field, wherein the first direction is perpendicular to the optical axis of the microscope, illumination means for creating a line-shaped light distribution for grid-shaped illumination of a sample in the locally limited grid field, during movement of the sample table in the at least first direction, detector means having local resolution for detecting line-shaped sample light and data recording of the detected sample light in two-dimensional image strips during movement of the sample table in at least the first direction and for recording of the position of the sample table, and means for copying the recorded data into a complete image according to the table position.

2. Light scanning microscope according to claim 1, wherein the locally-limited grid field is generated by movement of the light distribution in at least one direction.

3. Light scanning microscope according to claim 1, wherein the sample table is movable in a second direction perpendicular to the first direction and to the optical axis of the microscope.

4. Method of illuminating a sample using the laser scanning microscope of claim 1, comprising the steps of:
   (a) carrying out illumination of the sample, detection of sample light and data recording of the detection during movement of the sample table in at least one first direction over the dimensions of the locally-limited grid field, and
   (b) determining the respective position of the sample table using the data recorded by the detector means.

5. Method according to claim 4, wherein several image strips are adjacent to each other and wherein the method further comprises the step of composing an image from the stored image strips.

6. Method according to claim 5, wherein the image strips overlap and wherein the method further comprises the step of correcting the stored table position for at least one image strip using image comparisons.

7. Method according to claim 4, further comprising the step of generating the locally-limited grid field by movement of the light distribution in at least one direction.

8. Method according to claim 4, further comprising the steps of: (c) moving the sample table in a direction perpendicular to the first direction and to the optical axis of the microscope, (d) storing the movement position, and (e) repeating steps (a) and (b) for imaging several image strips.

9. Method according to claim 4, wherein several image strips are adjacent to each other, the method further comprising the step of composing an image from the stored image strips.

10. Method according to claim 9, wherein the image strips overlap, the method further comprising the step of correcting the stored table position for at least one strip using image comparisons.

* * * * *